(12) United States Patent
Kimura et al.

(10) Patent No.: US 9,322,091 B2
(45) Date of Patent: Apr. 26, 2016

(54) GALVANIZED STEEL SHEET

(71) Applicant: JFE STEEL CORPORATION, Chiyoda-ku, Tokyo (JP)

(72) Inventors: Hideyuki Kimura, Fukuyama (JP); Katsutoshi Takashima, Fukuyama (JP); Shinjiro Kaneko, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 14/375,053

(22) PCT Filed: Jan. 28, 2013

(86) PCT No.: PCT/JP2013/000434
§ 371 (c)(1),
(2) Date: Jul. 28, 2014

(87) PCT Pub. No.: WO2013/114850
PCT Pub. Date: Aug. 8, 2013

(65) Prior Publication Data
US 2015/0017472 A1  Jan. 15, 2015

(30) Foreign Application Priority Data

Jan. 31, 2012  (JP) ................. 2012-019312
Dec. 5, 2012  (JP) ................. 2012-266240

(51) Int. Cl.
| | |
|---|---|
| *C23C 2/02* | (2006.01) |
| *C21D 1/26* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/22* | (2006.01) |
| *C22C 38/24* | (2006.01) |
| *C22C 38/28* | (2006.01) |
| *C22C 38/38* | (2006.01) |

(Continued)

(52) U.S. Cl.
CPC ... *C23C 2/02* (2013.01); *C21D 1/26* (2013.01); *C21D 8/0226* (2013.01); *C21D 8/0236* (2013.01); *C21D 8/0263* (2013.01); *C21D 8/0273* (2013.01); *C21D 9/46* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/30* (2013.01); *C22C 38/38* (2013.01); *C22C 38/58* (2013.01); *C22C 38/60* (2013.01); *C23C 2/06* (2013.01); *C23C 2/26* (2013.01); *C23C 2/28* (2013.01); *C23C 2/285* (2013.01); *C25D 3/22* (2013.01); *C25D 5/36* (2013.01); *C25D 5/38* (2013.01); *C25D 5/50* (2013.01); *C21D 2211/005* (2013.01); *C21D 2211/008* (2013.01); *Y10T 428/12799* (2015.01); *Y10T 428/12972* (2015.01)

(58) Field of Classification Search
CPC ............ C23C 2/02; C23C 2/28; C23C 2/285; C23C 2/06; C23C 2/26; Y10T 428/12972; Y10T 428/12799; C22C 38/60; C22C 38/28; C22C 38/16; C22C 38/24; C22C 38/008; C22C 38/38; C22C 38/22; C22C 38/08; C22C 38/06; C22C 38/001; C22C 38/02; C22C 38/04; C22C 38/002; C22C 38/12; C22C 38/58; C22C 38/14; C22C 38/00; C22C 38/26; C22C 38/30; C22C 38/10
See application file for complete search history.

(56) References Cited

U.S. PATENT DOCUMENTS

2013/0032253 A1*  2/2013  Kariya et al. ................. 148/533
2013/0340898 A1  12/2013  Takashima

FOREIGN PATENT DOCUMENTS

JP  S 61-32375 B2  7/1986
JP  2000-303141 A  10/2000
(Continued)

OTHER PUBLICATIONS

Machine Translation, Mochida Tetsuo et al., JP 2004-211126, Jul. 2004.*

(Continued)

*Primary Examiner* — Michael E La Villa
(74) *Attorney, Agent, or Firm* — RatnerPrestia

(57) ABSTRACT

There is provided a high-strength galvanized steel sheet including, on a mass percent basis, C: more than 0.060% and 0.13% or less, Si: 0.01% or more and 0.7% or less, Mn: 1.0% or more and 3.0% or less, P: 0.005% or more and 0.100% or less, S: 0.010% or less, sol.Al: 0.005% or more and 0.100% or less, N: 0.0100% or less, Nb: 0.005% or more and 0.10% or less, Ti: 0.03% or more and 0.15% or less, and the balance comprising Fe and incidental impurities, satisfying the relationship of $(Nb/93+Ti^*/48)/(C/12)>0.08$ (wherein $Ti^*=Ti-(48/14)N-(48/32)S$). The high-strength galvanized steel sheet has a structure including ferrite and martensite. The ferrite has an average grain diameter of 15 μm or less and an area percentage of 80% or more. The martensite has an area percentage of 1% or more and 15% or less.

6 Claims, No Drawings

(51) Int. Cl.
*C22C 38/60* (2006.01)
*C23C 2/28* (2006.01)
*C22C 38/26* (2006.01)
*C22C 38/30* (2006.01)
*C22C 38/10* (2006.01)
*C25D 5/36* (2006.01)
*C25D 5/38* (2006.01)
*C25D 5/50* (2006.01)
*C25D 3/22* (2006.01)
*C23C 2/06* (2006.01)
*C23C 2/26* (2006.01)
*C21D 9/46* (2006.01)
*C22C 38/58* (2006.01)

(56) References Cited

FOREIGN PATENT DOCUMENTS

| | | |
|---|---|---|
| JP | 2000297350 | 10/2000 |
| JP | 3263143 B2 | 3/2002 |
| JP | 2004-211126 A | 7/2004 |
| JP | 2004-250774 A | 9/2004 |
| JP | 3887235 A | 2/2007 |
| JP | 2008240004 | 10/2008 |
| JP | 2009228080 | 10/2009 |
| JP | 2011-184788 A | 9/2011 |
| JP | 2011202272 | 10/2011 |
| JP | 2011-219855 A | 11/2011 |
| JP | 2011-225955 A | 11/2011 |
| WO | WO 2011/132763 * | 10/2011 |
| WO | WO 2012/043863 A1 | 4/2012 |

OTHER PUBLICATIONS

Machine Translation, JFE Steel, JP 2011-219855, Nov. 2011.*
International Search Report dated Apr. 16, 2013, application No. PCT/JP2013/000434.
European Search Report mailed Oct. 8, 2015 for European Application No. 13742881.9.

* cited by examiner

GALVANIZED STEEL SHEET

CROSS REFERENCE TO RELATED APPLICATIONS

This is the U.S. National Phase application of PCT/JP2013/000434, filed Jan. 28, 2013, which claims priority to Japanese Patent Application No. 2012-019312, filed Jan. 31, 2012, and 2012-266240, filed Dec. 5, 2012, the disclosures of each of these applications being incorporated herein by reference in their entireties for all purposes.

FIELD OF THE INVENTION

The present invention relates to a high-strength galvanized steel sheet having crashworthiness and excellent uniformity of mechanical characteristics in a coil formed thereof and a method for manufacturing the high-strength galvanized steel sheet. More particularly, the present invention relates to a high-strength steel sheet suitable as members of automotive structural components.

BACKGROUND OF THE INVENTION

In recent years, in order to reduce $CO_2$ emissions from the perspective of global environmental conservation, there has been a strong demand for weight reduction of automotive bodies. In addition, in order to ensure the safety of occupants in motor vehicle crashes, there has also been a strong demand for greater safety focusing on the crash characteristics of automotive bodies. To meet the demands, both weight reduction and reinforcement of automotive bodies must be achieved. It is therefore necessary to reduce the thickness of steel sheet serving as automotive body materials without significantly reducing the rigidity of the steel sheet. Furthermore, in order to improve crash resistance, it is also necessary to increase the yield ratio (YR) or the bake hardenability (BH) of the steel sheet.

Patent Literature 1 discloses a steel sheet containing C: 0.04% to 0.15%, Si: 0.20% or less, Mn: 1.0% to 2.5%, P: 0.050% or less, S: 0.020% or less, Al: 0.010% to 0.120%, and Cr: 0.1% to 2.0% and having a complex structure of three phases: ferrite, martensite, and bainite. This steel sheet has a high ductility and a high BH characteristic of a ferrite and martensite complex structure, and the additional bainite structure decreases hard martensite, which is the starting point of voids and reduces stretch flange formability.

Patent Literature 2 discloses a steel sheet containing C: 0.04% to 0.22%, Si: 1.0% or less, Mn: 3.0% or less, P: 0.05% or less, S: 0.01% or less, Al: 0.01% to 0.1%, N: 0.001% to 0.005%, and at least one selected from Nb, Ti, and V: 0.008% to 0.05% in total. The steel sheet has a ferrite and martensite complex structure. The martensite has a maximum particle size of ≤2 μm and an area percentage of ≥5%. This structure can have a reduced number of starting points of voids, which affect stretch flange formability, and thereby improve stretch flange formability. The martensite having an area percentage of ≥5% provides a high BH to the steel sheet.

However, in the technique described in Patent Literature 1, the BH is not more than 51 MPa, and the YR is as low as 0.51 to 0.58. Thus, it is necessary to further improve crash resistance. With respect to the technique described in Patent Literature 2, in spite of the high BH and excellent crashworthiness, there is no description of indicators of press formability, such as ductility and uniformity of mechanical characteristics.

In general, a high-strength steel sheet having a tensile strength (TS) of 590 MPa or more contains large amounts of various alloying elements for reinforcement. Thus, a variation in manufacturing conditions may cause a variation in type and amount of precipitates or second phases and result in a significant variation in mechanical characteristics, such as strength or elongation, in a coil of the steel sheet, particularly in the longitudinal direction of the coil. Such a variation makes it difficult to perform stable press forming in a continuous press line for automobiles and significantly reduces workability. Thus, the excellent uniformity of mechanical characteristics in a coil is strongly requested.

There have been many propositions of a technique for improving the uniformity of mechanical characteristics in a coil of high-strength steel sheet. For example, Patent Literature 3 discloses a technique for homogenizing the mechanical characteristics in a coil by adding Ti and Nb to a steel having a low carbon content of 0.0070% or less and coiling at a coiling temperature of 620° C. or more after hot-rolling the steel. In this technique, N responsible for a variation in mechanical characteristics is precipitated as TiN rather than AlN before finish rolling, and C is precipitated as complex carbides (Ti, Nb)C. However, the coiling temperature may decrease to less than 620° C. or locally decrease to less than 620° C. in actual operation, and this can cause a variation in precipitation behavior in the coil, resulting in a significant variation in mechanical characteristics. In particular, a low atomic ratio of Ti and Nb to C results in an insufficient precipitation of carbides and a significant degradation of mechanical characteristics at a top or bottom portion of the coil that can be relatively easily cooled.

Patent Literature 4 discloses a technique for reducing the dependence of mechanical characteristics, such as strength and elongation, on the coiling temperature by controlling the C content to more than 0.0050% and 0.010% or less and (Nb %×12)/(C %×93)=1.6 to 2.4. However, this technique is applicable to single-phase ferritic steel based on interstitial free (IF) steel, which is ultra-low carbon steel, and high-strength steel sheets having a tensile strength of 590 MPa or more are not described.

PATENT LITERATURE

PTL 1: Japanese Patent No. 3263143
PTL 2: Japanese Patent No. 3887235
PTL 3: Japanese Examined Patent Application Publication No. 61-032375
PTL 4: Japanese Unexamined Patent Application Publication No. 2000-303141

SUMMARY OF THE INVENTION

No known high-strength steel sheet has a YR and a BH that result in sufficient crash resistance and has excellent uniformity of mechanical characteristics in a coil formed thereof that is required for stable press forming in a continuous press line for automobiles.

The present invention aims to provide a high-strength galvanized steel sheet having a TS of 590 MPa or more, a high YR and a high BH in order to improve crashworthiness and also having excellent uniformity of mechanical characteristics in coil formed thereof, particularly strength and elongation, from the viewpoint of stable press forming and a method for manufacturing the high-strength galvanized steel sheet.

The present inventors have extensively studied various factors that influence reinforcement and crash resistance of a steel sheet and uniformity of mechanical characteristics in a coil of the steel sheet required for stable press forming. As a result, it is found that if a high-strength galvanized steel sheet contains, on a mass percent basis, C: more than 0.060% and 0.13% or less, Nb: 0.005% or more and 0.10% or less, Ti: 0.03% or more and 0.15% or less, S: 0.010% or less, and N: 0.0100% or less, satisfying (Nb/93+Ti*/48)/(C/12)>0.08 wherein Ti*(=Ti−(48/14)N−(48/32)S) is not fixed by N and S, and if the high-strength galvanized steel sheet has a structure including ferrite and martensite, the ferrite having an average grain diameter of 15 μm or less and an area percentage of 80% or more, the martensite having an area percentage of 1% or more and 15% or less, then the high-strength galvanized steel sheet has a TS of 590 MPa or more, a YR of 0.70 or more, and a BH of 60 MPa or more, and has excellent uniformity of mechanical characteristics in a coil formed thereof. It is also found that if the rolling reduction in final two passes in finish rolling of the steel having the composition described above is controlled, and annealing is conducted by heating the steel sheet from 700° C. to 800° C. at a low heating rate of less than 3° C./s, then the high-strength galvanized steel sheet having the structure and mechanical characteristics described above can be manufactured.

The present invention was achieved on the basis of these findings and includes the following aspects.

[1] A high-strength galvanized steel sheet having crashworthiness and excellent uniformity of mechanical characteristics in a coil formed thereof, comprising, on a mass percent basis, C: more than 0.060% and 0.13% or less, Si: 0.01% or more and 0.7% or less, Mn: 1.0% or more and 3.0% or less, P: 0.005% or more and 0.100% or less, S: 0.010% or less, sol.Al: 0.005% or more and 0.100% or less, N: 0.0100% or less, Nb: 0.005% or more and 0.10% or less, Ti: 0.03% or more and 0.15% or less, and the balance comprising Fe and incidental impurities, and satisfying the following formula (1), wherein the high-strength galvanized steel sheet has a structure including ferrite and martensite, the ferrite having an average grain diameter of 15 μm or less and an area percentage of 80% or more, the martensite having an area percentage of 1% or more and 15% or less:

$$(Nb/93+Ti*/48)/(C/12)>0.08 \quad (1)$$

wherein Ti*=Ti−(48/14)N−(48/32)S, and C, Nb, Ti, N, and S denote the corresponding content (mass %) of the steel.

[2] The high-strength galvanized steel sheet having crashworthiness and excellent uniformity of mechanical characteristics in a coil formed thereof according to [1], further comprising V: 0.10% or less on a mass percent basis.

[3] The high-strength galvanized steel sheet having crashworthiness and excellent uniformity of mechanical characteristics in a coil formed thereof according to [1] or [2], further comprising one or two of Mo and Cr: 0.50% or less in total on a mass percent basis.

[4] The high-strength galvanized steel sheet having crashworthiness and excellent uniformity of mechanical characteristics in a coil formed thereof according to any one of [1] to [3], further comprising one or two of Cu: 0.30% or less and Ni: 0.30% or less on a mass percent basis.

[5] The high-strength galvanized steel sheet having crashworthiness and excellent uniformity of mechanical characteristics in a coil formed thereof according to any one of [1] to [4], further comprising one or two of Sn: 0.2% or less and Sb: 0.2% or less on a mass percent basis.

[6] The high-strength galvanized steel sheet having crashworthiness and excellent uniformity of mechanical characteristics in a coil formed thereof according to any one of [1] to [5], further comprising Ta: 0.005% or more and 0.1% or less on a mass percent basis.

[7] The high-strength galvanized steel sheet having crashworthiness and excellent uniformity of mechanical characteristics in a coil formed thereof according to any one of [1] to [6], wherein the high-strength galvanized steel sheet has a tensile strength (TS) of 590 MPa or more, a yield ratio (YR) of 0.70 or more, and a bake hardenability (BH) level of 60 MPa or more.

[8] A method for manufacturing a high-strength galvanized steel sheet having crashworthiness and excellent uniformity of mechanical characteristics in a coil formed thereof, comprising: hot rolling a steel having the composition according to any one of [1] to [6], followed by cold rolling and annealing, wherein the hot rolling reduction in a final pass in finish rolling is 10% or more, and the hot rolling reduction in a pass before the final pass is 15% or more, and the average heating rate of annealing is less than 3° C./s from 700° C. to 800° C. and the annealing temperature is 800° C. to 900° C., and the average cooling rate from the annealing temperature is 3° C./s to 15° C./s, and the average cooling rate after galvanizing is 5° C./s to 100° C./s, or the average cooling rate after alloying after galvanizing is 5° C./s to 100° C./s.

[9] The method for manufacturing a high-strength galvanized steel sheet having crashworthiness and excellent uniformity of mechanical characteristics in a coil formed thereof according to [8], wherein the cooling is started within 3 seconds after the completion of the finish rolling, and the steel is cooled to 720° C. or less at an average cooling rate of 40° C./s or more and is coiled at a temperature in the range of 500° C. to 700° C., and then the cold rolling is performed at a rolling reduction of 40% or more.

[10] A method for manufacturing a high-strength galvanized steel sheet having crashworthiness and excellent uniformity of mechanical characteristics in a coil formed thereof, wherein the high-strength galvanized steel sheet manufactured in [8] or [9] has a tensile strength (TS) of 590 MPa or more, a yield ratio (YR) of 0.70 or more, and a bake hardening (BH) level of 60 MPa or more.

The present invention can provide a high-strength galvanized steel sheet that has a high TS of 590 MPa or more, a high YR≥0.70, a high BH≥60 MPa, and crashworthiness, and has small variations in mechanical characteristics, namely excellent uniformity of mechanical characteristics in a coil formed thereof. Thus, application of a high-strength galvanized steel sheet according to the present invention to automotive body members can improve the crash safety of automobiles and contribute to reduced weights of automobiles. Furthermore, because of excellent uniformity of mechanical characteristics in a coil of the high-strength galvanized steel sheet, the high-strength galvanized steel sheet can improve the workability in press forming.

DETAILED DESCRIPTION OF EMBODIMENTS OF THE INVENTION

The present invention will be described in detail below with reference to exemplary embodiments.

A high-strength steel sheet having a tensile strength of 590 MPa or more to which carbide-forming elements, such as Ti or Nb, are added, that is, a precipitation hardening type high-strength steel sheet has a high YR. A high-strength steel sheet containing hard second phases, such as martensites, that is, a structural hardening type high-strength steel sheet has a high BH. A high-strength galvanized steel sheet having a high YR and a high BH is expected to have good crashworthiness.

As a result of extensive studies, the present inventors found that a high YR and a high BH can be achieved by forming appropriate amount of martensite in a ferrite main phase, which has been subjected to precipitation hardening using Ti and/or Nb. The present inventors completed the present invention by finding that variations in mechanical characteristics, particularly variations in tensile strength (TS) and elongation (El), in the longitudinal direction of a coil of a high-strength steel sheet can be greatly reduced by controlling the rolling reduction in a final pass in finish hot rolling and the rolling reduction in a pass before the final pass within an appropriate range and appropriately controlling the cooling conditions after the finish hot rolling, thereby promoting the precipitation of NbC and TiC at a top or bottom portion of the hot-rolled coil that can be relatively easily cooled.

[Composition]

The composition of a steel according to embodiments of the present invention will be described below.

C: More than 0.060% and 0.13% or Less

C is an element that is effective for the reinforcement of a steel sheet. In particular, together with carbide-forming elements, such as Nb and Ti, C can form fine alloy compounds or alloy carbonitrides and thereby contributes to the reinforcement of a steel sheet and a high YR. C can also form martensites and thereby contributes to the reinforcement and a high BH. These effects require a C content of more than 0.060%. However, an excessively high C content of more than 0.13% results in poor formability and poor spot weldability because of excessive hardening of a steel sheet. Such an excessively high C content also results in excessive formation of martensites and continuous yielding due to a stress field around the martensite. This may result in a low YR and a low BH. Thus, a desired high YR and a desired high BH may not be achieved. Thus, the C content is more than 0.060% and 0.13% or less, preferably more than 0.060% and 0.10% or less.

Si: 0.01% or More and 0.7% or Less

Si is an element that contributes to the reinforcement due to solid-solution hardening while causing a relatively small reduction in ductility. Thus, Si contributes to not only the reinforcement but also an improved balance between strength and ductility. These effects require a Si content of 0.01% or more. However, a Si content of more than 0.7% tends to result in the formation of Si oxides on the surface of a steel sheet, possibly resulting in poor chemical conversion treatability, poor paint adhesion, and poor corrosion resistance after painting. Thus, the Si content is 0.01% or more and 0.7% or less, preferably 0.2% or more in order to improve the balance between strength and ductility, more preferably 0.2% or more and 0.5% or less.

Mn: 1.0% or More and 3.0% or Less

Mn is an element that contributes to solid-solution hardening and reinforcement due to the formation of martensites. This effect requires a Mn content of 1.0% or more. However, a Mn content of more than 3.0% results in an increased raw material cost and significantly poor formability and weldability. Such an excessively high Mn content also results in excessive formation of martensites and continuous yielding due to a stress field around the martensite. This may result in a low YR and a low BH. Thus, a desired high YR and a desired high BH may not be achieved. Thus, the Mn content is 1.0% or more and 3.0% or less, preferably 1.0% or more and 2.5% or less, more preferably 1.0% or more and 2.0% or less.

P: 0.005% or More and 0.100% or Less

P is an element that is effective for the reinforcement of a steel sheet due to solid-solution hardening. A P content of less than 0.005% not only is insufficient for the effect but also results in an increased dephosphorization cost in a steelmaking process. However, a P content of more than 0.100% results in low resistance to embrittlement in secondary forming operation and poor weldability because of the segregation of P in grain boundaries. Thus, the P content is 0.005% or more and 0.100% or less, preferably 0.010% or more in order to enhance the effect. The segregation of P in grain boundaries may also result in an undesired BH because of a reduction in the segregation of C in grain boundaries is believed to be effective for a high BH. Thus, the P content is preferably 0.080% or less, more preferably 0.050% or less.

S: 0.010% or Less

S is a detrimental element responsible for hot shortness. Sulfide inclusions in steel impair the formability of a steel sheet. Thus, S is preferably minimized, and the S content is 0.010% or less, preferably 0.008% or less. Although there is no particular lower limit of the S content, a very low S content results in a high steelmaking cost. Thus, the S content is preferably 0.0005% or more.

Sol.Al: 0.005% or More and 0.100% or Less

Al is an element derived from a deoxidizer and is effective for the reinforcement because of its solid-solution hardening ability. However, such an effect cannot be achieved at a sol.Al content of less than 0.005%. On the other hand, a sol.Al content of more than 0.100% results in an increased raw material cost and may be responsible for surface defects of a steel sheet. Thus, the sol.Al content is 0.005% or more and 0.100% or less.

N: 0.0100% or Less

A N content of more than 0.0100% results in low ductility, low toughness and low surface quality because of the formation of excess nitrides in steel. Thus, the N content is 0.0100% or less.

Nb: 0.005% or More and 0.10% or Less

Nb is one of important elements in the present invention. Nb contributes to the reinforcement by forming carbides or carbonitrides with C and/or N and also contributes to a high YR. Nb can provide a hot-rolled steel sheet having a finer structure. Such a hot-rolled steel sheet having a finer structure produces a fine ferrite grain size after cold rolling and annealing. This results in an increase in grain boundary area and an increase in the segregation of C in grain boundaries, which results in a high BH. Such effects require a Nb content of 0.005% or more. However, an excessively high Nb content of more than 0.10% results in an increased cost, an increased load in hot rolling, and an increased deformation resistance in cold rolling. Such an excessively high Nb content thereby makes stable manufacturing process difficult and results in a significantly poor formability. Although dissolved C is required to form martensites in a cooling process after annealing, excess Nb fixes all the carbon in the steel as NbC and thereby prevents the formation of martensites, thus possibly resulting in an undesired BH. Thus, the Nb content is 0.005% or more and 0.10% or less, preferably 0.08% or less, more preferably 0.05% or less.

Ti: 0.03% or More and 0.15% or Less

Like Nb, Ti contributes to the reinforcement by forming carbides or carbonitrides with C and/or N and also contributes to a high YR. Like Nb, Ti can provide a hot-rolled steel sheet having a finer structure and thereby reduce the ferrite grain size after cold rolling and annealing. This results in an increase in grain boundary area and an increase in the segregation of C in grain boundaries, which results in a high BH. Such effects require a Ti content of 0.03% or more. However, an excessively high Ti content of more than 0.15% results in an increased raw material cost and an increased deformation resistance in cold rolling, thereby making stable manufacturing process difficult. Like Nb, an excessively high Ti content results in a decreased amount of dissolved C and thereby prevents the formation of martensites in a cooling process after annealing, thus possibly resulting in an undesired BH.

Thus, the Ti content is 0.03% or more and 0.15% or less, preferably more than 0.05% in order to effectively produce the effects.

A high-strength steel sheet according to embodiments of the present invention has the composition described above, and C, Nb, Ti, N, and S in the composition satisfy the following formula (1):

$$(Nb/93 + Ti^*/48)/(C/12) > 0.08 \quad (1)$$

wherein $Ti^* = Ti - (48/14)N - (48/32)S$, provided that if $Ti - (48/14)N - (48/32)S \leq 0$, then $Ti - (48/14)N - (48/32)S = 0$. The element symbols in the formula represent the corresponding element contents (mass %).

A low atomic ratio of Ti or Nb to C in the left side of the formula (1) results in excessive formation of martensites and continuous yielding due to a stress field around the martensite. This results in a low YR and a low BH. Furthermore, NbC and TiC may precipitate insufficiently at a top portion of a coil that can be relatively easily cooled after hot-rolling and coiling. This can increase variations in mechanical characteristics in the coil. Thus, in order to ensure the desired characteristics and the uniformity of them in a coil in the present invention, $(Nb/93+Ti^*/48)/(C/12)$ is advantageously appropriately controlled, and the formula (1) defining $(Nb/93+Ti^*/48)/(C/12)$ is an important indicator in the present invention.

When the atomic ratio $(Nb/93+Ti^*/48)/(C/12)$ of Ti and Nb to C is 0.08 or less, this may result in increased martensites, an undesired YR, and an undesired BH, and may also result in increased variations in mechanical characteristics in a coil due to variations in precipitation behavior in hot-rolling and coiling. Thus, $(Nb/93+Ti^*/48)/(C/12)$ is more than 0.08, preferably 0.10 or more, more preferably 0.15 or more. When $(Nb/93+Ti^*/48)/(C/12)$ is more than 0.70, dissolved C required for the formation of martensites may be fixed as NbC or TiC. This may prevent the formation of martensites and result in an undesired TS and an undesired BH. Thus, in order to consistently achieve TS≥590 MPa and BH≥60 MPa, $(Nb/93+Ti^*/48)/(C/12)$ is preferably 0.70 or less.

A steel according to the present invention composed of these indispensable additive elements can have desired characteristics. In addition, V, one or two selected from Mo and Cr, and one or two selected from Cu and Ni may be added to these indispensable additive elements.

V: 0.10% or Less

Like Nb and Ti, V can form fine carbonitrides and contributes to the reinforcement. V may therefore be used if necessary. In order to produce this effect, the V content is preferably 0.01% or more. However, the effect levels off at a V content of more than 0.10%, and such a V content results in an increased raw material cost. Thus, when V is used, the V content is 0.10% or less.

One or Two Selected from Mo and Cr: 0.50% or Less in Total

Mo and Cr are elements that can improve quenching hardenability and contribute to the reinforcement due to the formation of martensites. Mo and Cr may therefore be used if necessary. These effects are noticeable at a Mo and Cr content of 0.10% or more in total. Thus, the Mo and Cr content is preferably 0.10% or more. However, the effects level off at a Mo and Cr content of more than 0.50% in total, and such a Mo and Cr content results in an increased raw material cost. Thus, when these elements are used, the Mo and Cr content is 0.50% or less in total.

One or Two Selected from Cu: 0.30% or Less and Ni: 0.30% or Less

Cu is a detrimental element that causes cracking in hot rolling and is responsible for surface flaws. However, Cu has small adverse effects on the mechanical characteristics of a cold-rolled steel sheet according to the present invention. Thus, a Cu content of 0.30% or less is acceptable. This allows the use of recycled raw materials, such as scraps, and can reduce the raw material cost. Like Cu, Ni has small effects on the steel sheet mechanical characteristics. Ni can effectively prevent the occurrence of surface flaws caused by the addition of Cu. This effect can be produced when the Ni content is at least half the Cu content. However, an excessively high Ni content induces another surface defects because of non-uniform formation of scale. Thus, when Ni is used, the Ni content is 0.30% or less.

In addition to these components, one or two selected from Sn and Sb and Ta may be added to a high-strength galvanized steel sheet according to the present invention.

One or Two Selected from Sn: 0.2% or Less and Sb: 0.2% or Less

Sn or Sb may be used to prevent nitriding or oxidation of the surface of a steel sheet or decarbonization due to oxidation in a region having a thickness of tens of micrometers on the surface of a steel sheet. The prevention of nitriding or oxidation can prevent a decrease in the formation of martensites on the surface of a steel sheet and improve fatigue characteristics and surface quality. When Sn or Sb is used, the Sn or Sb content is preferably 0.005% or more in order to prevent nitriding or oxidation. However, a Sn or Sb content of more than 0.2% results in lower toughness. Thus, the Sn or Sb content is preferably 0.2% or less.

Ta: 0.005% or More and 0.1% or Less

Like Nb and Ti, Ta contributes to the reinforcement by forming carbides or carbonitrides with C and/or N and also contributes to a high YR. Like Nb and Ti, Ta can provide a hot-rolled steel sheet having a finer structure and reduce the ferrite grain size after cold rolling and annealing. This results in an increased grain boundary area and increased segregation of C in grain boundaries, which results in a high BH. Thus, the Ta content may be 0.005% or more. However, an excessively high Ta content of more than 0.1% not only results in an increased raw material cost but also, like Nb and Ti, can prevent the formation of martensites in a cooling process after annealing. TaC precipitated in a hot-rolled steel sheet may increase deformation resistance in cold rolling and makes stable manufacturing process difficult. Thus, when Ta is used, the Ta content is preferably 0.1% or less.

The other components include Fe and incidental impurities. Another components may be used without losing the advantages of the present invention. Oxygen (O) forms non-metallic inclusions and adversely affects the mechanical characteristics of steel sheet. Thus, the oxygen content is preferably 0.003% or less.

[Structure]

The preferred structure of a high-strength galvanized steel sheet having crashworthiness and excellent uniformity of mechanical characteristics in a coil formed thereof according to the present invention will be described below.

A high-strength galvanized steel sheet according to embodiments of the present invention is composed of a ferrite main phase, which provides a high YR, and martensites, which provides a high BH. The ferrite main phase is subjected to precipitation hardening using Ti and/or Nb and has an average grain diameter of 15 µm or less and an area percentage of 80% or more. The martensite has an area percentage of 1% or more and 15% or less.

Ferrite: Average Grain Diameter of 15 µm or Less and Area Percentage of 80% or More The ferrite has an average grain diameter that results in a high BH. When the ferrite has an average grain diameter of more than 15 μm, the grain boundary area of the ferrite decreases, and the segregation of C in the grain boundaries decreases. Thus, it may be difficult to achieve a high BH. Thus, the ferrite has an average grain diameter of 15 μm or less, preferably 12 μm or less. The ferrite subjected to precipitation hardening using Nb and/or Ti has an area percentage that results in a high YR. When the ferrite has an area percentage of less than 80%, this results in a large amount of hard second phase, such as martensites, continuous yielding due to a stress field around the hard second phase, and a low YR or a low BH. Thus, it may be difficult to achieve high crash resistance. Thus, the ferrite has an area percentage of 80% or more, preferably 85% or more, more preferably 88% or more.

Martensite: Area Percentage of 1% or More and 15% or Less

Martensite is a hard phase that imparts strength to a steel sheet according to the present invention and provides a high BH. When the martensite has an area percentage of less than 1%, the steel sheet has low strength, and not only TS of 590 MPa or more but also BH of 60 MPa or more are difficult to achieve. When the martensite has an area percentage of more than 15%, this results in an increase in dislocation or elastic strain around the martensite, and plastic strain originates easily from the vicinity of the martensite, resulting in continuous yielding. This results in a low YR and a low BH and makes it difficult to achieve high crash resistance. Thus, the martensite has an area percentage of 1% or more and 15% or less, preferably 12% or less.

In addition to ferrite and martensite, a steel sheet according to the present invention may contain pearlites, bainites, retained austenites, and carbides. The area percentage of these components may be 5% or less in total.

The area percentage can be determined by polishing an L cross section (a vertical cross section parallel to the rolling direction) of a steel sheet, corroding the L cross section with nital, observing five fields with a scanning electron microscope (SEM) at a magnification of 2000, and analyzing the structure image. In the structure image, ferrite appears as a region of slightly black contrast, pearlite appears as a region containing lamellar carbide, bainite appears as a region containing carbide having a dot sequential pattern, and martensite and retained austenite (retained γ) appear as particles having white contrast. The average grain diameter of ferrite is measured using an intercept method according to JIS G 0522.

[Mechanical Characteristics]

A high-strength galvanized steel sheet according to the present invention typically has the following mechanical characteristics.

(1) TS≥590 MPa

In recent years, there has been a strong demand for weight reduction of automotive bodies and improved safety of occupants in motor vehicle crashes. To meet the demand, it is necessary to reinforce steel sheets serving as automotive body materials. A steel sheet having a TS of 590 MPa or more meets the demand.

(2) YR≥0.70 and BH≥60 MPa

The YR and the BH of a steel sheet must be increased to improve crash resistance. A steel sheet having a YR≥0.70 and a BH≥60 MPa can have desired crash resistance. The YR is the ratio of the yield point (YP) to the TS: YR=YP/TS.

(3) ΔTS≤30 MPa, ΔYP≤30 MPa, ΔEl≤3.0%

In order to evaluate the uniformity of mechanical characteristics in a coil, JIS No. 5 test pieces for a tensile test (JIS Z 2201) in which the tensile direction is a vertical direction (a C direction) with respect to the rolling direction, are sampled from nine portions at a middle position in the width direction and at a position separated from the side edges by one quarter of the width at a longitudinal top portion (a T portion at a position 10 m from the coil top end), a longitudinal middle portion (an M portion), and a longitudinal bottom portion (a B portion at a position 10 m from the coil bottom end) of the coil. The TS, the YP, and the El of the coil are measured in a tensile test according to JIS Z 2241. The uniformity of mechanical characteristics is evaluated on the basis of the differences ΔTS, ΔYP, and ΔEl between the maximum value and the minimum value of each of the TS, the YP, and the El. A steel sheet having ΔTS≤30 MPa, ΔYP≤30 MPa, and ΔEl≤3.0% has satisfactory the uniformity of mechanical characteristics in a coil formed thereof.

[Manufacturing Method]

A method for manufacturing a high-strength galvanized steel sheet according to aspects of the present invention will be described below.

A high-strength galvanized steel sheet according to the present invention can be manufactured by forming a slab from a steel having the composition as described above and subjecting the slab to hot rolling, cold rolling, annealing, and galvanizing or alloying after galvanizing. In the hot rolling, the rolling reduction in a final pass is 10% or more, and the rolling reduction in a pass before the final pass is 15% or more. The annealing process involves heating the steel from 700° C. to 800° C. at an average heating rate of less than 3° C./s, annealing the steel at an annealing temperature in the range of 800° C. to 900° C., cooling the steel from the annealing temperature at an average cooling rate in the range of 3° C. to 15° C./s, immersing the steel in a galvanizing bath to perform hot-dip galvanizing, cooling the steel after the hot-dip galvanizing at an average cooling rate in the range of 5° C./s to 100° C./s, or alloying the galvanized steel after the hot-dip galvanizing, and cooling the steel after the alloying at an average cooling rate in the range of 5° C. to 100° C./s. Preferably, the cooling is started within 3 seconds after the completion of the finish rolling, the steel is cooled to 720° C. or less at an average cooling rate of 40° C./s or more and is coiled at a temperature in the range of 500° C. to 700° C., and then the cold rolling is performed at a rolling reduction of 40% or more.

(Manufacture of Steel)

A steel slab used in a manufacturing method according to the present invention is preferably manufactured using a continuous casting process so as to prevent macro-segregation of the components. The steel slab may also be manufactured using an ingot-making process or a thin slab casting process. In addition to a conventional process of cooling the manufactured steel slab to room temperature and reheating the steel slab, an energy-saving process may also be applied to the steel slab without problems. For example, the hot steel slab may be transferred into a furnace without cooling and may be subjected to hot rolling (hot direct rolling). Alternatively, the hot steel slab may be slightly heated and may be immediately subjected to hot rolling (hot direct rolling and direct rolling). Alternatively, the hot steel slab may be transferred into a furnace while maintained at a high temperature, thereby eliminating part of reheating (hot charging).

A slab heating temperature of less than 1000° C. results in an increased rolling load and a greater risk of trouble in hot rolling. Thus, the slab heating temperature is preferably 1000° C. or more. The upper limit of the slab heating temperature is preferably 1300° C. because of an increase in scale loss associated with an increased weight of oxides.

(Hot Rolling)

The steel slab is subjected to hot rolling, including rough rolling and finish rolling. First, the steel slab is formed into a sheet bar by rough rolling. The conditions for rough rolling are not particularly limited and may be general conditions. In order to reduce the slab heating temperature and prevent trouble in hot rolling, it is effective to use a sheet bar heater for heating a sheet bar.

The sheet bar is then formed into a hot-rolled steel sheet by finish rolling. The rolling reduction in the final pass and a pass before the final pass in the finish rolling is advantageously controlled within an appropriate range in the present invention. The rolling reduction in the final pass is 10% or more, and the rolling reduction in the pass before the final pass is 15% or more.

When the rolling reduction in the final pass in the finish rolling is 10% or more, many shear bands are formed in prior austenite grains, and many nucleation sites for ferrite transformation are formed. This can provide a hot-rolled steel sheet having a finer structure and promotes the precipitation of NbC and TiC at top and bottom portions of the hot-rolled coil that can be relatively easily cooled. Such a hot-rolled steel sheet having a finer structure has a smaller average ferrite grain diameter after cold rolling and annealing. Thus, the BH is effectively increased due to increased segregation of C in grain boundaries associated with an increased grain boundary area. Promoted precipitation of NbC and TiC is effective in improving the uniformity of mechanical characteristics in the coil. A rolling reduction of less than 10% in the final pass results in an insufficient decrease in ferrite grain size and an insufficient precipitation of NbC and TiC. Thus, the BH and the uniformity of mechanical characteristics in the coil may not be improved. The rolling reduction in the final pass is preferably 13% or more.

In order to further improve the BH and the uniformity of mechanical characteristics in the coil, in addition to the control of the rolling reduction in the final pass, the rolling reduction in the pass before the final pass must be controlled within an appropriate range. When the rolling reduction in the pass before the final pass is 15% or more, many shear bands are formed in prior austenite grains due to a further enhanced strain accumulation effect, and further increased nucleation sites for ferrite transformation are formed. This can provide a hot-rolled steel sheet having a finer structure. This is also effective in promoting precipitation of NbC and TiC, thus further improving the BH and the uniformity of mechanical characteristics in the coil. A rolling reduction of less than 15% in the pass before the final pass results in an insufficient decrease in ferrite grain size and an insufficient precipitation of NbC and TiC. Thus, the BH and the uniformity of mechanical characteristics in the coil may not be improved. The rolling reduction in the pass before the final pass is preferably 18% or more.

Since the rolling load increases with increasing rolling reduction in the final pass and the pass before the final pass, the rolling reduction in these two passes is preferably less than 40%.

The rolling temperature in the final pass and the pass before the final pass is not particularly limited. The rolling temperature in the final pass is preferably 830° C. or more, more preferably 860° C. or more. The rolling temperature in the pass before the final pass is preferably 1000° C. or less, more preferably 960° C. or less.

A rolling temperature of less than 830° C. in the final pass may result in increased transformation from un-recrystallized austenite to ferrite, a heterogeneous steel sheet structure after cold rolling and annealing that extends in the rolling direction under the influence of the structure of the hot-rolled steel sheet, and poor formability.

When the rolling temperature of the pass before the final pass is more than 1000° C., because of an insufficient strain accumulation effect due to recovery, it is difficult to provide a hot-rolled steel sheet having a finer structure. Furthermore, since an effect of promoting precipitation of NbC and TiC is reduced, the BH and the uniformity of mechanical characteristics in the coil may not be improved.

In order to improve the BH by reducing the crystal grain size and improve the uniformity of mechanical characteristics in the coil by promoting the precipitation of NbC and TiC, preferably, cooling of the hot-rolled steel sheet is started within 3 seconds after the completion of the finish rolling, and the hot-rolled steel sheet is cooled to 720° C. or less at an average cooling rate of 40° C./s or more and is coiled at a temperature in the range of 500° C. to 700° C.

When the time to the start of cooling is more than 3 seconds, or the average cooling rate is less than 40° C./s, or the finish cooling temperature is more than 720° C., the hot-rolled steel sheet may have a coarse structure, and the BH may not be improved. When the coiling temperature is more than 700° C., the hot-rolled steel sheet may have a coarse structure, a low strength and a low BH after cold rolling and annealing. When the coiling temperature is less than 500° C., NbC and TiC are difficult to precipitate, dissolved C increases, and martensites become excessive, which is unfavorable for a high BH. Furthermore, great variations in precipitation behavior of NbC and TiC are also unfavorable in terms of the uniformity of mechanical characteristics in the coil.

(Cold Rolling)

The hot-rolled steel sheet is then subjected to pickling if necessary and cold rolling to form a cold-rolled steel sheet. The pickling is not essential and may be performed if necessary. The pickling may be performed under general conditions.

The cold rolling conditions are not particularly limited, provided that the cold-rolled steel sheet has desired dimensions and shape. The rolling reduction in the cold rolling is preferably 40% or more. A rolling reduction of more than 90% results in a high rolling load and trouble in rolling. Thus, the rolling reduction is preferably 90% or less.

(Annealing)

The cold-rolled steel sheet is then annealed so as to have desired strength and crash resistance. As described above, the annealing process involves heating the steel sheet from 700° C. to 800° C. at an average heating rate of less than 3° C./s, annealing the steel sheet at an annealing temperature in the range of 800° C. to 900° C., and cooling the steel sheet from the annealing temperature at an average cooling rate in the range of 3° C./s to 15° C./s. After annealing, the steel sheet is subjected to immersing in a galvanizing bath to perform hot-dip galvanizing, and cooling after the hot-dip galvanizing at an average cooling rate in the range of 5° C. to 100° C./s, or alloying after the hot-dip galvanizing, and cooling after the alloying at an average cooling rate in the range of 5° C./s to 100° C./s.

Average Heating Rate in Temperature Range of 700° C. to 800° C.: Less than 3° C./s In embodiments of the present invention, TiC and NbC are precipitated in the hot-rolled steel sheet. The cold-rolled steel sheet after the cold-rolling process therefore has a relatively high recrystallization temperature. Thus, deformed structure tends to remain in the steel. This significantly decreases the ductility of the steel sheet, impairs press formability, lowers the BH level, and increases variations in mechanical characteristics. When the cold-rolled steel sheet is heated to the annealing temperature, the steel sheet must be heated from 700° C. to 800° C. at an average heating rate as low as less than 3° C./s in order to promote recrystallization and ensure uniformity of mechanical characteristics. The average heating rate is preferably 0.5° C./s or more in terms of productivity.

Annealing Temperature: 800° C. to 900° C.

In order for a steel sheet structure according to embodiments of the present invention to be a complex structure of ferrite and martensite having a desired area percentage, the annealing temperature must be the two-phase temperature of ferrite and austenite and ranges from 800° C. to 900° C. An annealing temperature of less than 800° C. results in insufficient formation of martensite after annealing and cooling and an undesired BH. Furthermore, because of insufficient recrystallization in the annealing, deformed structure tends to remain in the steel. This results in significantly low press formability due to low ductility of the steel sheet, a low BH, and increased variations in mechanical characteristics. On the other hand, an annealing temperature of more than 900° C. results in a low amount of dissolved C in ferrite and, depending on the cooling conditions, results in an undesired BH. An annealing temperature of more than 900° C. leads to an austenite single phase. Thus, depending on the subsequent cooling rate, a second phase (martensite, bainite, pearlite) increases too much, and the steel sheet is susceptible to continuous yielding due to a stress field around the second phase, particularly around martensite. This results in a low YR or a low BH, possibly making it difficult to ensure crashworthiness. This also results in a low productivity and a high energy cost. Thus, the annealing temperature ranges from 800° C. to 900° C., preferably 800° C. to 870° C.

The soaking time in the annealing is preferably 15 seconds or more in order to promote recrystallization, part of austenite transformation, and the concentration of elements, such as C, in austenite. However, a soaking time of more than 300 seconds may result in deterioration of the characteristics of the steel sheet, such as coarsening of crystal grains, low strength, poor quality of the surface of the steel sheet, and a low BH. This also results in a very low line speed in a continuous galvanizing line and a low productivity. Thus, the soaking time in the annealing preferably ranges from 15 to 300 seconds, more preferably 15 to 200 seconds.

Average Cooling Rate from Annealing Temperature to Galvanizing Bath Temperature (Primary Cooling Rate): 3° C./s to 15° C./s After soaking at the annealing temperature, the steel sheet is cooled to the galvanizing bath temperature, which is generally in the range of 420° C. to 500° C., at an average cooling rate in the range of 3° C./s to 15° C./s. When the average cooling rate is less than 3° C./s, the steel sheet passes through a pearlite nose at a temperature in the range of 550° C. to 650° C., which may result in the formation of a large amount of pearlite and bainite in a second phase and an insufficient amount of martensite. This results in not only a significantly low ductility but also a low strength and a low BH. When the average cooling rate is more than 15° C./s, this results in an insufficient concentration of elements, such as Mn or C, in γ due to transformation from γ to α during cooling from the annealing temperature, and pearlites tend to be formed in the alloying after galvanizing. This may result in an insufficient amount of martensite, which results in not only a significantly low ductility but also a low strength and a low BH. Thus, the average cooling rate from the annealing temperature to the galvanizing bath temperature is in the range of 3° C./s to 15° C./s, preferably 5° C./s to 15° C./s.

After cooling at the primary cooling rate, the steel sheet is immersed in a galvanizing bath for hot-dip galvanizing. The hot-dip galvanizing may be performed using routine procedures. If necessary, the immersing of the steel sheet in the galvanizing bath for hot-dip galvanizing may be followed by alloying treatment of the galvanized steel. In this case, the alloying treatment of the galvanized steel may involve heating the galvanized steel to a temperature in the range of 500° C. to 700° C. after the hot-dip galvanizing and holding the temperature for several to several tens of seconds. In a steel sheet according to embodiments of the present invention, the cooling rate from the annealing temperature to the galvanizing bath temperature is controlled as described above, so that a large amount of pearlites are not formed in the alloying treatment, and a predetermined amount of martensite is formed. Thus, the steel sheet can have a desired strength without losing a ductility and a BH. With respect to the galvanization conditions, the amount of coating ranges from 20 to 70 g/m² per side. For alloying, the Fe % of the coated layer preferably ranges from 6% to 15%.

Average Cooling Rate after Hot-Dip Galvanizing or after Alloying Treatment of Galvanized Steel (Secondary Cooling Rate): 5° C./s to 100° C./s When the secondary cooling rate to a temperature of 150° C. or less after the hot-dip galvanizing or the alloying treatment of the galvanized steel is as low as less than 5° C./s on average, pearlites or bainites may be formed at a temperature in the range of approximately 400° C. to 500° C., and a predetermined amount of martensite may not be formed. Thus, a desired strength or a desired BH may not be achieved. On the other hand, a secondary cooling rate of more than 100° C./s on average results in excessively hard martensites and a low ductility. Thus, in order to form stable martensites, the secondary cooling rate ranges from 5° C./s to 100° C./s, preferably 10° C./s to 100° C./s, on average.

In the present invention, after the cooling, skin pass rolling or leveling may also be performed so as to correct the shape and control the surface roughness of the steel sheet. The elongation percentage in the skin pass rolling preferably ranges from approximately 0.3% to 1.5%.

EXAMPLES

Examples of the present invention will be described below.

Example 1

Molten steels having the composition shown in Table 1 were prepared in a converter and formed into slabs having a thickness of 230 mm using a continuous casting process. The steel slab was heated to 1220° C., hot-rolled, and coiled, producing a hot-rolled steel sheet with a thickness of 3.5 mm. Table 2 shows the hot rolling temperature, the hot rolling reduction of a final pass and a pass before the final pass in finish rolling, the average cooling rate from the start of cooling after the completion of the finish rolling to a temperature of 720° C. or less, and the coiling temperature. The time interval between the completion of the finish rolling and the start of cooling was 3 seconds or less.

The hot-rolled steel sheet was then subjected to pickling and cold rolling under the conditions shown in Table 2. The resulting cold-rolled steel sheet had a thickness of 1.4 mm. The cold-rolled steel sheet was then subjected to continuous annealing and galvanizing under the conditions shown in Table 2 and skin pass rolling at an elongation percentage of 0.7% to form a galvanized steel sheet (product). The amount of coating in the hot-dip galvanizing was 50 g/m² per side (coating on both sides). Alloying treatment after galvanizing was performed such that the Fe % of the coated layer ranged from 9% to 12%.

A sample was taken from the galvanized steel sheet at a position separated from the side edges by one quarter of the width in the middle portion (an M portion) in the longitudinal direction of the coil. The sample was subjected to structural observation, a tensile test in which the tensile direction was a vertical direction (a C direction) with respect to the rolling direction, and a bake hardening test using the following method to determine the steel sheet structure, the area percentages of a ferrite phase and a martensite phase, the average grain diameter of ferrite, the YP, the TS, the YR, the El, and the BH. A tensile test in which the tensile direction was a vertical direction (a C direction) with respect to the rolling direction was performed for nine portions at a middle position in the width direction and at a position separated from the side edges by one quarter of the width at a longitudinal top portion (a T portion at a position 10 m from the coil top end), a longitudinal middle portion (an M portion), and a longitudinal bottom portion (a B portion at a position 10 m from the coil bottom end) of the coil. The YP, the TS, and the El of the coil were measured to calculate the differences ΔTS, ΔYP, and ΔEl between the maximum value and the minimum value of each of the TS, the YP, and the El. This will be specifically described below.

(i) Structural Observation

A test specimen for structural observation was taken from the galvanized steel sheet at a position separated from the side edges by one quarter of the width at a middle portion (an M portion) in the longitudinal direction of the coil. An L cross section (a vertical cross section parallel to the rolling direction) was mechanically polished and was corroded with nital. The steel sheet structure and the area percentages of ferrite and martensite were determined from a structural image (SEM image) of the L cross section taken with a scanning electron microscope (SEM) at a magnification of 2000. In the structural image, ferrite appeared as a region of slightly black contrast, pearlite appeared as a region containing lamellar carbides, bainite appeared as a region containing carbides having a dot sequential pattern, and martensite and retained austenite (retained γ) appeared as particles having white contrast. The test specimen was subjected to tempering at 250° C. for 4 hours. A structural image was taken as described above. Considering a region containing lamellar carbides as pearlite before the heat treatment and a region containing carbides having a dot sequential pattern as bainite or martensite before the heat treatment, the area percentages of pearlite and bainite or martensite were determined again. Fine particles having white contrast were considered as retained γ. The area percentage of martensite was calculated from the difference between the area percentage of the fine particles having white contrast and the area percentage of particles having white contrast before the tempering (martensite and retained γ). The area percentage of each phase was determined using image analysis software (Digital Image Pro Plus ver. 4.0, manufactured by Microsoft Corp.) after coloring each phase differently on a transparent OHP sheet and performing binarization after image capturing. The average grain diameter of ferrite was measured using an intercept method according to JIS G 0522.

(ii) Tensile Test

A JIS No. 5 test piece for a tensile test (JIS Z 2201) was sampled from the galvanized steel sheet at a position separated from the side edges by one quarter of the width at a middle portion (an M portion) in the longitudinal direction of the coil such that the tensile direction was a vertical direction (a C direction) with respect to the rolling direction. The test piece was subjected to a tensile test according to JIS Z 2241 to measure the YP, the TS, the YR, and the El of the galvanized steel sheet. After a tensile pre-strain of 2% was applied to the JIS No. 5 test piece sampled from the galvanized steel sheet, and a treatment equivalent to baking at 170° C. for 20 minutes was performed, the BH was calculated by subtracting the yield stress at the pre-strain from the upper yield point after the heat treatment.

A tensile test in which the tensile direction is a vertical direction (a C direction) with respect to the rolling direction was performed for nine portions at a middle position in the width direction and at a position separated from the side edges by one quarter of the width at a longitudinal top portion (a T portion at a position 10 m from the coil top end), a longitudinal middle portion (an M portion), and a longitudinal bottom portion (a B portion at a position 10 m from the coil bottom end) of the coil. The YP, the TS, and the El of the coil were measured to calculate the differences ΔTS, ΔYP, and ΔEl between the maximum value and the minimum value of each of the TS, the YP, and the El.

Table 3 shows the results.

The galvanized steel sheets Nos. 5 to 19 and 21 to 24 according to examples of the present invention, which have a steel composition according to embodiments of the present invention and are manufactured by a method according to embodiments of the present invention, have a TS of 590 MPa or more, a YR of 0.70 or more, and a BH of 60 MPa or more. These examples have ΔYP and ΔTS of 30 MPa or less and ΔEl of 3.0% or less. Thus, the examples have excellent uniformity in the longitudinal direction of the coil.

In the steel sheet No. 1 according to a comparative example, in which the C, Nb, and Ti contents and the atomic ratio of Ti and Nb to C represented by (Nb/93+Ti*/48)/(C/12) are below the scope of the present invention, martensite is excessively formed, and continuous yielding tends to occur because of a stress field around martensite. Thus, the YR and the BH decreased, and YR≥0.70 and BH≥60 MPa are not achieved. Furthermore, because of a low atomic ratio of Ti and Nb to C, the precipitation of NbC and TiC is insufficient at a top end of a coil that could be relatively easily cooled after hot-rolling and coiling, variations in mechanical characteristics in the coil increase, and ΔYP≤30 MPa, ΔTS≤30 MPa, and ΔEl≤3.0% are not achieved.

The steel sheet No. 2 according to a comparative example, which has Mn and P contents below the scope of the present invention, a large amount pearlite is formed during cooling after annealing or in alloying treatment. Thus, a desired amount of martensite is not formed, and TS≥590 MPa and BH≥60 MPa are not achieved. In the steel sheet No. 3 according to a comparative example, which has Nb and Ti contents above the scope of the present invention, C in the steel is fixed as NbC and TiC, thereby preventing the formation of martensite. Thus, a desired amount of martensite is not formed, and TS≥590 MPa and BH≥60 MPa are not achieved. In the steel sheet No. 4 according to a comparative example, which has a Mn content above the scope of the present invention, martensite is excessively formed, and YR≥0.70 and BH≥60 MPa are not achieved. The steel sheet No. 4, which also has a P content above the scope of the present invention, might have low resistance to embrittlement in secondary forming operation, and the segregation of C in a grain boundary effective for a high BH decreases because of the segregation of P in the grain boundaries. Thus, BH≥60 MPa is not achieved.

In the steel sheet No. 20 according to a comparative example, which has a C content above the scope of the present invention and an atomic ratio of Ti and Nb to C below the scope of the present invention, martensite is excessively formed, the YR and the BH decrease, and YR≥0.70 and BH≥60 MPa are not achieved. Furthermore, because of a low atomic ratio of Ti and Nb to C, the precipitation of NbC and TiC is insufficient at a top end of a coil that could be relatively easily cooled after hot-rolling and coiling, variations in mechanical characteristics in the coil increase, and ΔYP≤30 MPa and ΔEl≤3.0% are not achieved.

TABLE 1

| Steel No. | Chemical component (mass %) | | | | | | | | | | | Ti* = Ti − (48/14)N − (48/32)S | (Nb/93 + Ti*/48)/(C/12) | Note |
|---|---|---|---|---|---|---|---|---|---|---|---|---|---|---|
| | C | Si | Mn | P | S | sol.Al | N | Nb | Ti | Ta | Others | | | |
| A | 0.054 | 0.05 | 1.6 | 0.035 | 0.001 | 0.043 | 0.0014 | 0.004 | 0.008 | — | — | 0.00 | 0.01 | Comparative steel |
| B | 0.061 | 0.16 | 0.9 | 0.004 | 0.006 | 0.033 | 0.0044 | 0.025 | 0.059 | — | — | 0.03 | 0.18 | Comparative steel |
| C | 0.070 | 0.02 | 1.8 | 0.033 | 0.002 | 0.031 | 0.0025 | 0.108 | 0.158 | — | — | 0.15 | 0.73 | Comparative steel |
| D | 0.085 | 0.02 | 3.1 | 0.106 | 0.007 | 0.038 | 0.0041 | 0.015 | 0.098 | — | — | 0.07 | 0.23 | Comparative steel |
| E | 0.061 | 0.06 | 1.8 | 0.029 | 0.002 | 0.041 | 0.0033 | 0.095 | 0.095 | — | — | 0.08 | 0.53 | Inventive steel |
| F | 0.076 | 0.29 | 1.9 | 0.035 | 0.005 | 0.025 | 0.0029 | 0.015 | 0.061 | — | — | 0.04 | 0.16 | Inventive steel |
| G | 0.082 | 0.02 | 1.8 | 0.045 | 0.007 | 0.039 | 0.0033 | 0.011 | 0.056 | — | — | 0.03 | 0.11 | Inventive steel |
| H | 0.072 | 0.07 | 1.9 | 0.041 | 0.003 | 0.055 | 0.0026 | 0.008 | 0.078 | — | — | 0.06 | 0.22 | Inventive steel |
| I | 0.079 | 0.20 | 1.7 | 0.048 | 0.008 | 0.042 | 0.0031 | 0.013 | 0.088 | — | — | 0.07 | 0.24 | Inventive steel |
| J | 0.081 | 0.56 | 2.0 | 0.068 | 0.003 | 0.035 | 0.0029 | 0.012 | 0.050 | — | — | 0.04 | 0.14 | Inventive steel |
| K | 0.092 | 0.61 | 1.9 | 0.085 | 0.005 | 0.055 | 0.0025 | 0.055 | 0.032 | — | Mo: 0.20 Cr: 0.20 | 0.02 | 0.13 | Inventive steel |
| L | 0.091 | 0.03 | 1.6 | 0.039 | 0.003 | 0.043 | 0.0042 | 0.045 | 0.044 | — | — | 0.03 | 0.15 | Inventive steel |
| M | 0.095 | 0.59 | 1.4 | 0.033 | 0.002 | 0.026 | 0.0039 | 0.095 | 0.075 | — | V: 0.04 Cr: 0.30 | 0.06 | 0.29 | Inventive steel |
| N | 0.090 | 0.32 | 2.6 | 0.044 | 0.004 | 0.029 | 0.0041 | 0.035 | 0.089 | — | Cu: 0.24 Ni: 0.12 | 0.07 | 0.24 | Inventive steel |
| O | 0.095 | 0.69 | 1.6 | 0.041 | 0.006 | 0.033 | 0.0044 | 0.088 | 0.135 | — | — | 0.11 | 0.41 | Inventive steel |
| P | 0.112 | 0.05 | 1.8 | 0.044 | 0.005 | 0.039 | 0.0029 | 0.025 | 0.122 | — | — | 0.10 | 0.25 | Inventive steel |
| Q | 0.122 | 0.22 | 1.5 | 0.075 | 0.003 | 0.042 | 0.0025 | 0.033 | 0.109 | — | — | 0.10 | 0.24 | Inventive steel |
| R | 0.120 | 0.35 | 1.4 | 0.055 | 0.004 | 0.044 | 0.0026 | 0.048 | 0.088 | — | — | 0.07 | 0.20 | Inventive steel |
| S | 0.127 | 0.65 | 1.6 | 0.045 | 0.005 | 0.029 | 0.0031 | 0.075 | 0.095 | — | — | 0.08 | 0.23 | Inventive steel |
| T | 0.143 | 0.81 | 2.5 | 0.038 | 0.008 | 0.041 | 0.0042 | 0.033 | 0.049 | — | — | 0.02 | 0.06 | Comparative steel |
| U | 0.066 | 0.20 | 1.8 | 0.032 | 0.002 | 0.033 | 0.0026 | 0.020 | 0.050 | 0.04 | Sn: 0.02 | 0.04 | 0.19 | Inventive steel |
| V | 0.098 | 0.38 | 1.9 | 0.050 | 0.005 | 0.043 | 0.0028 | 0.021 | 0.082 | 0.05 | Sn: 0.02 Sb: 0.03 | 0.06 | 0.18 | Inventive steel |
| W | 0.123 | 0.51 | 1.6 | 0.033 | 0.003 | 0.033 | 0.0019 | 0.022 | 0.125 | 0.03 | Sn: 0.03 | 0.11 | 0.25 | Inventive steel |
| X | 0.119 | 0.55 | 1.7 | 0.052 | 0.005 | 0.042 | 0.0035 | 0.015 | 0.124 | 0.02 | — | 0.10 | 0.23 | Inventive steel |

If Ti* = Ti − (48/14)N − (48/32)S ≤ 0, then Ti* = 0

TABLE 2

| Steel sheet No. | Steel No. | Hot rolling process | | | | | | Cold rolling process |
|---|---|---|---|---|---|---|---|---|
| | | Pass before final pass | | Final pass | | Cooling rate after finish rolling (°C./s)*1 | Coiling temperature (°C.) | Rolling reduction (%) |
| | | Rolling temperature (°C.) | Rolling reduction (%) | Rolling temperature (°C.) | Rolling reduction (%) | | | |
| 1 | A | 970 | 18 | 890 | 14 | 40 | 650 | 60 |
| 2 | B | 970 | 18 | 890 | 14 | 40 | 650 | 60 |
| 3 | C | 970 | 18 | 890 | 14 | 40 | 650 | 60 |
| 4 | D | 970 | 18 | 890 | 14 | 40 | 650 | 60 |
| 5 | E | 970 | 18 | 890 | 14 | 40 | 650 | 60 |
| 6 | F | 970 | 18 | 890 | 14 | 40 | 650 | 60 |
| 7 | G | 970 | 18 | 890 | 14 | 40 | 650 | 60 |
| 8 | H | 970 | 18 | 890 | 14 | 40 | 650 | 60 |
| 9 | I | 970 | 18 | 890 | 14 | 40 | 650 | 60 |
| 10 | J | 970 | 18 | 890 | 14 | 40 | 650 | 60 |
| 11 | K | 970 | 18 | 890 | 14 | 40 | 650 | 60 |
| 12 | L | 970 | 18 | 890 | 14 | 40 | 650 | 60 |
| 13 | M | 970 | 18 | 890 | 14 | 40 | 650 | 60 |
| 14 | N | 970 | 18 | 890 | 14 | 40 | 650 | 60 |
| 15 | O | 970 | 18 | 890 | 14 | 40 | 650 | 60 |
| 16 | P | 970 | 18 | 890 | 14 | 40 | 650 | 60 |
| 17 | Q | 970 | 18 | 890 | 14 | 40 | 650 | 60 |
| 18 | R | 970 | 18 | 890 | 14 | 40 | 650 | 60 |
| 19 | S | 970 | 18 | 890 | 14 | 40 | 650 | 60 |
| 20 | T | 970 | 18 | 890 | 14 | 40 | 650 | 60 |
| 21 | U | 970 | 18 | 890 | 14 | 40 | 650 | 60 |
| 22 | V | 970 | 18 | 890 | 14 | 40 | 650 | 60 |
| 23 | W | 970 | 18 | 890 | 14 | 40 | 650 | 60 |
| 24 | X | 970 | 18 | 890 | 14 | 40 | 650 | 60 |

TABLE 2-continued

| | Annealing process | | | | | | Skin pass rolling process |
|---|---|---|---|---|---|---|---|
| Steel sheet No. | Average heating rate from 700° C. to 800° C. (° C./s) | Annealing temperature (° C.) | Holding time at annealing temperature (s) | Primary cooling rate (° C./s)*2 | Alloying conditions | Secondary cooling rate (° C./s)*3 | Elongation percentage (%) |
| 1 | 1 | 850 | 150 | 10 | 520° C. × 20 s | 30 | 0.7 |
| 2 | 1 | 860 | 150 | 10 | 520° C. × 20 s | 30 | 0.7 |
| 3 | 1 | 850 | 150 | 10 | 520° C. × 20 s | 30 | 0.7 |
| 4 | 1 | 860 | 150 | 10 | 520° C. × 20 s | 30 | 0.7 |
| 5 | 1 | 860 | 150 | 10 | 520° C. × 20 s | 30 | 0.7 |
| 6 | 1 | 860 | 150 | 10 | 520° C. × 20 s | 30 | 0.7 |
| 7 | 1 | 850 | 150 | 10 | 520° C. × 20 s | 30 | 0.7 |
| 8 | 1 | 860 | 150 | 10 | 520° C. × 20 s | 30 | 0.7 |
| 9 | 1 | 850 | 150 | 10 | 520° C. × 20 s | 30 | 0.7 |
| 10 | 1 | 860 | 150 | 10 | 520° C. × 20 s | 30 | 0.7 |
| 11 | 1 | 860 | 150 | 10 | 520° C. × 20 s | 30 | 0.7 |
| 12 | 1 | 850 | 150 | 10 | 520° C. × 20 s | 30 | 0.7 |
| 13 | 1 | 860 | 150 | 10 | 520° C. × 20 s | 30 | 0.7 |
| 14 | 1 | 860 | 150 | 10 | 520° C. × 20 s | 30 | 0.7 |
| 15 | 1 | 850 | 150 | 10 | 520° C. × 20 s | 30 | 0.7 |
| 16 | 1 | 860 | 150 | 10 | 520° C. × 20 s | 30 | 0.7 |
| 17 | 1 | 850 | 150 | 10 | 520° C. × 20 s | 30 | 0.7 |
| 18 | 1 | 850 | 150 | 10 | 520° C. × 20 s | 30 | 0.7 |
| 19 | 1 | 850 | 150 | 10 | 520° C. × 20 s | 30 | 0.7 |
| 20 | 1 | 860 | 150 | 10 | 520° C. × 20 s | 30 | 0.7 |
| 21 | 1 | 850 | 150 | 10 | 520° C. × 20 s | 30 | 0.7 |
| 22 | 1 | 850 | 150 | 10 | 520° C. × 20 s | 30 | 0.7 |
| 23 | 1 | 850 | 150 | 10 | 520° C. × 20 s | 30 | 0.7 |
| 24 | 1 | 850 | 150 | 10 | 520° C. × 20 s | 30 | 0.7 |

*1Average cooling rate from the start of cooling after the completion of the finish rolling to a temperature of 720° C. or less
*2Average cooling rate from annealing temperature to galvanizing bath
*3Average cooling rate to a temperature of 150° C. or less after hot-dip galvanizing or after alloying treatment of galvanized steel

TABLE 3

| | | Steel structure | | | | Mechanical characteristics | | | | | | | | |
|---|---|---|---|---|---|---|---|---|---|---|---|---|---|---|
| | | Ferrite | | Martensite | | | | | | | | | | |
| Steel sheet No. | Steel No. | Area percentage (%) | Average grain diameter (µm) | Area percentage (%) | Others* | YP (MPa) | TS (MPa) | YR | El (%) | BH (MPa) | ΔYP (MPa) | ΔTS (MPa) | ΔEl (%) | Note |
| 1 | A | 79 | 19.5 | 18 | P | 427 | 689 | 0.62 | 26.5 | 42 | 36 | 33 | 3.4 | Comparative example |
| 2 | B | 88 | 10.0 | 0.3 | P | 512 | 569 | 0.90 | 31.3 | 49 | 25 | 21 | 2.8 | Comparative example |
| 3 | C | 99 | 2.6 | 0.4 | P | 518 | 582 | 0.89 | 30.8 | 49 | 12 | 13 | 1.3 | Comparative example |
| 4 | D | 83 | 7.0 | 16 | B | 434 | 678 | 0.64 | 26.7 | 38 | 22 | 19 | 2.3 | Comparative example |
| 5 | E | 93 | 2.3 | 4 | P, B | 514 | 612 | 0.84 | 29.1 | 83 | 9 | 8 | 1.0 | Example |
| 6 | F | 88 | 11.1 | 11 | P, B | 482 | 651 | 0.74 | 27.3 | 79 | 23 | 21 | 2.1 | Example |
| 7 | G | 85 | 13.8 | 14 | P, B | 470 | 662 | 0.71 | 26.9 | 70 | 30 | 25 | 2.8 | Example |
| 8 | H | 90 | 7.4 | 9 | P, B | 493 | 640 | 0.77 | 27.8 | 92 | 21 | 20 | 2.1 | Example |
| 9 | I | 86 | 6.2 | 11 | P, B | 482 | 651 | 0.74 | 27.3 | 84 | 22 | 19 | 2.3 | Example |
| 10 | J | 85 | 11.9 | 13 | P, B | 470 | 662 | 0.71 | 26.9 | 73 | 25 | 21 | 2.4 | Example |
| 11 | K | 84 | 14.1 | 15 | P, B | 467 | 667 | 0.70 | 26.7 | 61 | 28 | 25 | 2.6 | Example |
| 12 | L | 85 | 11.7 | 13 | P, B | 470 | 662 | 0.71 | 26.9 | 72 | 26 | 23 | 2.7 | Example |
| 13 | M | 89 | 3.7 | 8 | P, B | 493 | 640 | 0.77 | 27.8 | 92 | 18 | 16 | 1.9 | Example |
| 14 | N | 89 | 6.1 | 10 | B | 484 | 645 | 0.75 | 27.6 | 93 | 19 | 19 | 1.7 | Example |
| 15 | O | 90 | 2.1 | 6 | P, B | 505 | 623 | 0.81 | 28.6 | 85 | 15 | 11 | 1.6 | Example |
| 16 | P | 87 | 5.7 | 10 | P, B | 484 | 645 | 0.75 | 27.6 | 92 | 25 | 19 | 2.4 | Example |
| 17 | Q | 88 | 6.4 | 11 | P, B | 482 | 651 | 0.74 | 27.3 | 82 | 20 | 20 | 2.2 | Example |
| 18 | R | 87 | 8.8 | 12 | P, B | 472 | 656 | 0.72 | 27.1 | 82 | 25 | 18 | 2.4 | Example |
| 19 | S | 86 | 10.0 | 11 | B, γ | 470 | 662 | 0.71 | 26.9 | 82 | 21 | 16 | 2.1 | Example |
| 20 | T | 78 | 16.3 | 20 | B, γ | 420 | 700 | 0.60 | 25.4 | 30 | 33 | 28 | 3.3 | Comparative example |
| 21 | U | 85 | 9.2 | 13 | P, B | 484 | 682 | 0.71 | 26.1 | 80 | 20 | 24 | 2.4 | Example |
| 22 | V | 86 | 9.8 | 13 | P, B | 481 | 678 | 0.71 | 26.3 | 81 | 19 | 23 | 2.3 | Example |
| 23 | W | 87 | 6.0 | 11 | P, B | 497 | 671 | 0.74 | 26.5 | 85 | 18 | 21 | 2.1 | Example |
| 24 | X | 86 | 7.2 | 11 | P, B | 494 | 667 | 0.74 | 26.7 | 82 | 19 | 22 | 2.2 | Example |

*P: pearlite, B: bainite, γ: retained austenite (retained γ)

Example 2

Molten steels having the composition of steel G and P shown in Table 1 were prepared in a converter and formed into slabs having a thickness of 230 mm using a continuous casting process. The steel slab was heated to 1220° C., hot-rolled, and coiled, producing a hot-rolled steel sheet with a thickness of 3.5 mm. Table 4 shows the hot rolling temperature, the hot rolling reduction of a final pass and a pass before the final pass in finish rolling, the average cooling rate from the start of cooling after the completion of the finish rolling to a temperature of 720° C. or less, and the coiling temperature. The time interval between the completion of the finish rolling and the start of cooling was 3 seconds or less.

The hot-rolled steel sheet was then subjected to pickling and cold rolling under the conditions shown in Table 4. The resulting cold-rolled steel sheet had a thickness of 1.4 mm. The cold-rolled steel sheet was then subjected to continuous annealing and galvanizing under the conditions shown in Table 4 and skin pass rolling at an elongation percentage of 0.7% to form a galvanized steel sheet (product). The amount of coating in the hot-dip galvanizing was 50 g/m² per side (coating on both sides). Alloying treatment after galvanizing was performed such that the Fe % of the coated layer ranged from 9% to 12%.

The area percentages of ferrite phase and martensite phase, the average grain diameter of ferrite, the YP, the TS, the YR, the El, and the BH of the galvanized steel sheet were measured in the same manner as in Example 1. Furthermore, variations in TS, YP, and El in the longitudinal and width directions of a coil of the galvanized steel sheet and ΔTS, ΔYP, and ΔEl were determined.

Table 5 shows the results.

The galvanized steel sheets Nos. 25 to 31, 33, 34, and 37 to 40 according to examples, which have a steel composition according to the present invention and are manufactured by a method according to the present invention, have a TS of 590 MPa or more, a YR of 0.70 or more, and a BH of 60 MPa or more. These examples have ΔYP and ΔTS of 30 MPa or less and ΔEl of 3.0% or less. Thus, the examples have excellent uniformity in the longitudinal direction of the coil.

Among these examples, the steel sheets Nos. 25, 27, and 28, in which the average cooling rate after the completion of the finish rolling is 40° C./s or more in order to reduce the size of the structure of the hot-rolled steel sheet and thereby achieve a high BH, have a higher BH than the steel sheet No. 29, in which the average cooling rate after the completion of the finish rolling is less than 40° C./s. The steel sheets Nos. 25, 27 to 29, 31, 33, and 34, in which the hot rolling reductions in a final pass in finish rolling and a pass before the final pass are 13% or more and 15% or more, respectively, in order to improve uniformity of mechanical characteristics in the coil due to an effect of promoting the precipitation of NbC and TiC in a hot-rolled steel sheet, have lower ΔYP, ΔTS, and ΔEl and excellent uniformity of mechanical characteristics in a coil formed thereof than steel sheets Nos. 26 and 30, in which the hot rolling reductions in a final pass and a pass before the final pass are less than 13% and less than 15%, respectively.

In contrast, the steel sheet No. 32 according to a comparative example, in which the hot rolling reductions in a final pass in finish rolling and a pass before the final pass and the primary cooling rate from the annealing temperature to the galvanizing bath temperature are below the scope of the present invention, has a large ferrite grain size above the scope of the present invention, an insufficient BH, and an area percentage of martensite phase above the scope of the present invention. Thus, a desired YR of 0.70 or more is not achieved. Furthermore, an effect of promoting the precipitation of NbC and TiC in a hot-rolled steel sheet is not produced, and desired ΔYP≤30 MPa, ΔTS≤30 MPa, and ΔEl≤3.0 are not achieved.

In the steel sheet No. 35 according to a comparative example, which has an annealing temperature below the scope of the present invention, a desired amount of martensite is not formed, the TS is less than 590 MPa, and the BH is less than 60 MPa. In the steel sheet No. 36 according to a comparative example, which has an annealing temperature above the scope of the present invention, because of annealing in an austenite single phase area, the amount of dissolved C in ferrite decreases, and the ferrite grain size after cooling is above the scope of the present invention due to austenite grain growth. Thus, a desired BH is not achieved. Furthermore, the steel sheet No. 36 had a significantly low ductility because of excessive formation of pearlite and bainite.

In the steel sheet No. 41 according to a comparative example, in which the average heating rate at a temperature in the range of 700° C. to 800° C. in annealing is above the scope of the present invention, recrystallization is insufficient, ΔYP is more than 30 MPa, and ΔEl is more than 3.0%.

TABLE 4

| | | Hot rolling process | | | | | | Cold rolling process |
|---|---|---|---|---|---|---|---|---|
| | | Pass before final pass | | Final pass | | | | |
| Steel sheet No. | Steel No. | Rolling temperature (° C.) | Rolling reduction (%) | Rolling temperature (° C.) | Rolling reduction (%) | Cooling rate after finish rolling (° C./s)*1 | Coiling temperature (° C.) | Rolling reduction (%) |
| 25 | G | 970 | 18 | 890 | 14 | 40 | 650 | 60 |
| 26 | | 970 | 15 | 870 | 10 | 20 | 600 | 60 |
| 27 | | 970 | 20 | 870 | 15 | 40 | 600 | 60 |
| 28 | | 970 | 20 | 880 | 15 | 80 | 620 | 60 |
| 29 | | 970 | 18 | 870 | 14 | 20 | 600 | 60 |
| 30 | | 1010 | 15 | 870 | 10 | 20 | 600 | 60 |
| 31 | | 950 | 18 | 810 | 14 | 20 | 600 | 60 |
| 32 | | 970 | 12 | 870 | 7 | 20 | 600 | 60 |
| 33 | | 950 | 18 | 870 | 14 | 20 | 480 | 60 |
| 34 | | 960 | 18 | 870 | 14 | 20 | 710 | 60 |
| 35 | | 970 | 15 | 850 | 10 | 20 | 620 | 60 |
| 36 | | 970 | 15 | 850 | 10 | 20 | 620 | 60 |
| 37 | P | 970 | 18 | 890 | 14 | 40 | 650 | 60 |
| 38 | | 970 | 18 | 870 | 14 | 20 | 550 | 60 |
| 39 | | 970 | 18 | 870 | 14 | 20 | 550 | 60 |
| 40 | | 970 | 18 | 870 | 14 | 20 | 600 | 60 |
| 41 | | 970 | 18 | 870 | 14 | 20 | 600 | 60 |

TABLE 4-continued

| Steel sheet No. | Average heating rate from 700° C. to 800° C. (° C./s) | Annealing temperature (° C.) | Holding time at annealing temperature (s) | Primary cooling rate (° C./s)*2 | Alloying conditions | Secondary cooling rate (° C./s)*3 | Skin pass rolling process Elongation percentage (%) |
|---|---|---|---|---|---|---|---|
| 25 | 1 | 850 | 150 | 10 | 520° C. × 20 s | 30 | 0.7 |
| 26 | 2 | 850 | 150 | 10 | 520° C. × 20 s | 30 | 0.7 |
| 27 | 1 | 860 | 150 | 10 | 520° C. × 20 s | 30 | 0.7 |
| 28 | 2 | 860 | 150 | 10 | 520° C. × 20 s | 30 | 0.7 |
| 29 | 1 | 850 | 150 | 10 | 520° C. × 20 s | 30 | 0.7 |
| 30 | 1 | 850 | 80 | 5 | 520° C. × 20 s | 60 | 0.7 |
| 31 | 1 | 850 | 150 | 5 | 520° C. × 20 s | 40 | 0.7 |
| 32 | 2 | 850 | 150 | 1 | 520° C. × 20 s | 40 | 0.7 |
| 33 | 2 | 840 | 150 | 10 | 520° C. × 20 s | 40 | 0.7 |
| 34 | 2 | 850 | 150 | 10 | 520° C. × 20 s | 40 | 0.7 |
| 35 | 2 | 780 | 150 | 20 | 520° C. × 20 s | 30 | 0.7 |
| 36 | 2 | 910 | 150 | 15 | 520° C. × 20 s | 3 | 0.7 |
| 37 | 1 | 860 | 150 | 10 | 520° C. × 20 s | 30 | 0.7 |
| 38 | 1 | 860 | 10 | 15 | None | 60 | 0.7 |
| 39 | 1 | 860 | 350 | 10 | 520° C. × 20 s | 30 | 0.7 |
| 40 | 1 | 880 | 150 | 10 | None | 60 | 0.7 |
| 41 | 10 | 850 | 50 | 10 | 520° C. × 20 s | 30 | 0.7 |

*1Average cooling rate from the start of cooling after the completion of the finish rolling to a temperature of 720° C. or less
*2Average cooling rate from annealing temperature to galvanizing bath
*3Average cooling rate to a temperature of 150° C. or less after hot-dip galvanizing or after alloying treatment of galvanized steel

TABLE 5

| Steel sheet No. | Steel No. | Steel structure Ferrite Area percentage (%) | Ferrite Average grain diameter (μm) | Martensite Area percentage (%) | Others* | YP (MPa) | TS (MPa) | YR | El (%) | BH (MPa) | ΔYP (MPa) | ΔTS (MPa) | ΔEl (%) | Note |
|---|---|---|---|---|---|---|---|---|---|---|---|---|---|---|
| 25 | G | 85 | 13.8 | 14 | P, B | 470 | 662 | 0.71 | 26.9 | 70 | 30 | 25 | 2.8 | Example |
| 26 | | 84 | 14.3 | 15 | P, B | 466 | 666 | 0.70 | 27.0 | 62 | 30 | 28 | 3.0 | Example |
| 27 | | 85 | 12.1 | 13 | P, B | 495 | 668 | 0.74 | 26.2 | 70 | 26 | 23 | 2.6 | Example |
| 28 | | 86 | 11.6 | 12 | P, B | 509 | 674 | 0.76 | 25.7 | 74 | 24 | 20 | 2.4 | Example |
| 29 | | 85 | 13.1 | 14 | P, B | 472 | 664 | 0.71 | 26.7 | 64 | 28 | 22 | 2.5 | Example |
| 30 | | 84 | 14.5 | 14 | P, B | 469 | 658 | 0.71 | 26.8 | 60 | 30 | 29 | 3.0 | Example |
| 31 | | 85 | 12.1 | 13 | P, B | 477 | 675 | 0.71 | 26.9 | 70 | 24 | 20 | 2.3 | Example |
| 32 | | 81 | 16.1 | 17 | P, B | 435 | 672 | 0.65 | 27.5 | 54 | 35 | 32 | 3.3 | Comparative example |
| 33 | | 83 | 12.8 | 15 | P, B | 466 | 667 | 0.70 | 27.0 | 65 | 30 | 26 | 2.8 | Example |
| 34 | | 86 | 14.0 | 12 | P, B | 475 | 655 | 0.73 | 26.7 | 65 | 25 | 20 | 2.3 | Example |
| 35 | | 99 | 14.2 | 0.4 | P, B | 502 | 571 | 0.88 | 28.3 | 52 | 15 | 17 | 1.5 | Comparative example |
| 36 | | 80 | 16.2 | 2 | P, B | 495 | 602 | 0.82 | 27.4 | 54 | 25 | 22 | 2.5 | Comparative example |
| 37 | P | 87 | 5.7 | 10 | P, B | 484 | 645 | 0.75 | 27.6 | 92 | 25 | 19 | 2.4 | Example |
| 38 | | 92 | 5.5 | 8 | — | 490 | 638 | 0.77 | 28.2 | 89 | 23 | 18 | 2.2 | Example |
| 39 | | 87 | 6.9 | 12 | B | 474 | 652 | 0.73 | 27.6 | 81 | 24 | 19 | 2.3 | Example |
| 40 | | 88 | 5.9 | 12 | — | 470 | 655 | 0.72 | 27.6 | 85 | 22 | 17 | 2.2 | Example |
| 41 | | 88 | 4.8 | 10 | B | 525 | 666 | 0.79 | 22.6 | 78 | 31 | 26 | 3.2 | Comparative example |

*P: pearlite, B: bainite, γ: retained austenite (retained γ)

A high-strength galvanized steel sheet according to the present invention is not limited to automotive members and can be suitably used in other applications that require high strength and crashworthiness. Thus, a high-strength galvanized steel sheet according to the present invention is also suitable as a material for parts of household electrical appliances and steel tubes.

The invention claimed is:

1. A high-strength galvanized steel sheet formed into a coil and having crashworthiness and excellent uniformity of mechanical characteristics, comprising, on a mass percent basis, C: more than 0.060% and 0.13% or less, Si: 0.01% or more and 0.7% or less, Mn: 1.0% or more and 3.0% or less, P: 0.005% or more and 0.100% or less, S: 0.010% or less, sol.Al: 0.005% or more and 0.100% or less, N: 0.0100% or less, Nb: 0.005% or more and 0.10% or less, Ti: 0.03% or more and 0.15% or less, and the balance comprising Fe and incidental impurities, and satisfying the following formula (1), wherein the high-strength galvanized steel sheet has a structure including ferrite and martensite, the ferrite having an average grain diameter of 15 μm or less and an area percentage of 80% or more, the martensite having an area percentage of 1% or more and 15% or less:

$$(Nb/93+Ti^*/48)/(C/12)>0.08 \quad (1)$$

wherein Ti*=Ti−(48/14)N−(48/32)S, and C, Nb, Ti, N, and S denote the corresponding content (mass %) of the steel;

wherein the high-strength galvanized steel sheet has a tensile strength (TS) of 590 MPa or more, a yield ratio (YR) of 0.70 or more, and a bake hardenability (BH) level of 60 MPa or more.

2. The high-strength galvanized steel sheet formed into a coil and having crashworthiness and excellent uniformity of mechanical characteristics according to claim 1, further comprising V: between 0% and 0.10% on a mass percent basis.

3. The high-strength galvanized steel sheet formed into a coil and having crashworthiness and excellent uniformity of mechanical characteristics according to claim 1, further comprising one or two of Mo and Cr: between 0% and 0.50% in total on a mass percent basis.

4. The high-strength galvanized steel sheet formed into a coil and having crashworthiness and excellent uniformity of mechanical characteristics according to claim 1, further comprising one or two of Cu: between 0% and 0.30% and Ni: between 0% and 0.30% on a mass percent basis.

5. The high-strength galvanized steel sheet formed into a coil and having crashworthiness and excellent uniformity of mechanical characteristics thereof according to claim 1, further comprising one or two of Sn: between 0% and 0.2% and Sb: between 0% and 0.2% on a mass percent basis.

6. The high-strength galvanized steel sheet formed into a coil and having crashworthiness and excellent uniformity of mechanical characteristics according to claim 1, further comprising Ta: 0.005% or more and 0.1% or less on a mass percent basis.

* * * * *